US009679392B2

(12) United States Patent
Richardson

(10) Patent No.: US 9,679,392 B2
(45) Date of Patent: Jun. 13, 2017

(54) HOSTED CAMERA REMOTE CONTROL

(71) Applicant: NaturalPoint, Inc., Corvallis, OR (US)

(72) Inventor: James D. Richardson, Corvallis, OR (US)

(73) Assignee: NaturalPoint, Inc., Corvallis, OR (US)

( * ) Notice: Subject to any disclaimer, the term of this patent is extended or adjusted under 35 U.S.C. 154(b) by 0 days.

(21) Appl. No.: 14/802,854

(22) Filed: Jul. 17, 2015

(65) Prior Publication Data

US 2015/0325002 A1    Nov. 12, 2015

Related U.S. Application Data

(63) Continuation of application No. 13/189,393, filed on Jul. 22, 2011, now Pat. No. 9,100,587.

(51) Int. Cl.
| | |
|---|---|
| *H04N 5/00* | (2011.01) |
| *G06T 7/20* | (2017.01) |
| *H04N 5/232* | (2006.01) |
| *H04N 13/02* | (2006.01) |
| *H04N 5/247* | (2006.01) |
| *H04N 5/222* | (2006.01) |

(52) U.S. Cl.
CPC ........... *G06T 7/20* (2013.01); *H04N 5/23203* (2013.01); *H04N 5/23216* (2013.01); *H04N 5/23229* (2013.01); *H04N 5/247* (2013.01); *H04N 13/0282* (2013.01); *G06T 2200/04* (2013.01); *G06T 2207/10012* (2013.01); *H04N 5/2224* (2013.01)

(58) Field of Classification Search
CPC .......... H04N 7/181; H04N 5/232; H04N 7/18; H04N 5/262; G08B 13/19641; G08B 13/19673; G08B 13/19693; G08B 13/19695
See application file for complete search history.

(56) References Cited

U.S. PATENT DOCUMENTS

| | | | | |
|---|---|---|---|---|
| 6,774,935 B1* | 8/2004 | Morimoto | .......... | H04N 1/00347 348/211.3 |
| 7,102,666 B2* | 9/2006 | Kanade | .................. | G03B 41/00 348/142 |
| 8,203,628 B2* | 6/2012 | Honjo | .................... | G02B 7/102 348/240.99 |
| 8,274,564 B2* | 9/2012 | Girgensohn | ........... | H04N 5/247 348/143 |
| 2007/0282951 A1* | 12/2007 | Selimis | .................. | H04L 67/06 709/205 |
| 2007/0285560 A1* | 12/2007 | Perlman | ................ | G06T 1/0007 348/371 |

(Continued)

*Primary Examiner* — Frank Huang
(74) *Attorney, Agent, or Firm* — Alleman Hall Creasman & Tuttle LLP

(57) ABSTRACT

A motion capture system includes motion capture cameras positioned in various locations and orientations with respect to a motion capture volume. The motion capture system includes a host computing device that is operatively coupled with the motion capture cameras. The host computing device remotely controls operation of the motion capture cameras to record movement within the motion capture volume. At least one of the motion capture cameras includes a user-interface that is operable by a user to remotely initiate a control operation of the host computing device.

20 Claims, 6 Drawing Sheets

(56) References Cited

U.S. PATENT DOCUMENTS

| | | | |
|---|---|---|---|
| 2007/0294621 A1* | 12/2007 | Hansen | G06F 17/3005 715/716 |
| 2011/0025853 A1* | 2/2011 | Richardson | G06T 7/2033 348/159 |
| 2011/0080424 A1* | 4/2011 | Peters | H04N 1/387 345/620 |
| 2011/0149074 A1* | 6/2011 | Lee | H04N 7/181 348/143 |
| 2013/0155058 A1* | 6/2013 | Golparvar-Fard | G06T 19/006 345/419 |

* cited by examiner

HOSTED CAMERA REMOTE CONTROL

CROSS-REFERENCE TO RELATED APPLICATION(S)

The present application is a continuation of U.S. patent application Ser. No. 13/189,393, filed Jul. 22, 2011, entitled "Hosted Camera Remote Control," the entire contents of which are incorporated herein by reference for all purposes.

BACKGROUND

Motion capture systems typically employ multiple cameras to track and capture movement of objects in a motion capture volume (e.g., markers affixed to an actor's clothing or body). Typically, the cameras in these systems are completely host-controlled, in the sense that there are no local controls whatsoever on the cameras themselves. The only action that is taken locally at a camera is the installation of the camera (e.g., on a scaffolding or other frame/support structure) and aiming of the camera with respect to the capture volume. All other control and configuration is conducted via a user interface at a host computing device.

One problem with the absence of on-camera controls is that the aiming operation can be difficult and may involve trial and error to achieve appropriate coverage of the capture volume. Often an operator will need to shuttle back and forth between the host computing device and the camera (or cameras) in order to accurately aim all of the cameras. For example, the operator may be positioned up on a ladder at the camera to aim the camera to an approximate orientation. Then the operator would need to descend the ladder and go back to the host computing device to view an image of the camera's view of the capture volume resulting from the camera's orientation for positioning feedback. If the orientation was undesirable, the operator would have to return to the camera's location and adjust the orientation, then return to the host computing device to view the positioning feedback, and so on until a desired camera orientation was achieved. Furthermore, upon achieving a desired orientation for one camera, the operator would have to return to the host computing device to switch the camera view presented by the host computing device to the next camera for positioning feedback of the next camera.

Repeatedly shuttling back and forth between the host computing device and each camera to view positioning feedback or switch between different camera views or perform other tasks is tedious, particularly for motion capture configurations that include a large number of cameras. Moreover, in some configurations, it is difficult to identify which camera is associated with a camera view that is selected for display at the host computing device without adding additional identifying marking on each camera or performing additional calibration procedures, which only increase the time and complexity of the aiming process.

Furthermore, a given camera may be in an undesired operating mode, such as in a scene mode during a calibration or aim adjustment, instead of a marker-tracking mode, for example. Also, a frame rate and/or viewing size window may need to be adjusted to perform calibration or aiming operations. Further still, a focus of the camera may need to be performed at the camera and assessed at the host computing device. In general, the need for the operator to be periodically at the camera location and the host computing device location creates numerous issues that can significantly complicate configuration and operation of the motion capture system.

SUMMARY

In one embodiment, a motion capture system includes motion capture cameras positioned in various locations and orientations with respect to a motion capture volume. The motion capture system includes a host computing device that is operatively coupled with the motion capture cameras. The host computing device remotely controls operation of the motion capture cameras to record movement within the motion capture volume. At least one of the motion capture cameras includes a user-interface that is operable by a user to remotely initiate a control operation of the host computing device.

By providing a user interface on the motion capture camera that remotely initiates control of the host computing device in response to receiving user input, the host computing device can be at least partially controlled from the location of the motion capture camera. This remote control functionality may reduce multiple trips to the host computing device to adjust camera settings, change operating modes, switch between views from different cameras that are displayed by the host computing device or a feedback monitor, etc. In this way, the amount of time needed to setup and calibrate motion capture cameras in a motion capture system may be reduced.

DETAILED DESCRIPTION

The present disclosure is related to setup and calibration of motion capture cameras in a motion capture system. More particularly, the present disclosure is related to remotely initiating control of a host computing device that controls operation of a plurality of motion capture cameras from a motion capture camera. In particular, such remote initiation of control of the host computing device reduces shuttling back and forth between the host computing device and motion capture cameras during setup and calibration of the motion capture system. In this way, the process of setting up and calibrating the motion capture system may be made less tedious and labor intensive and may be achieved in a shorter period of time.

Figure 1:
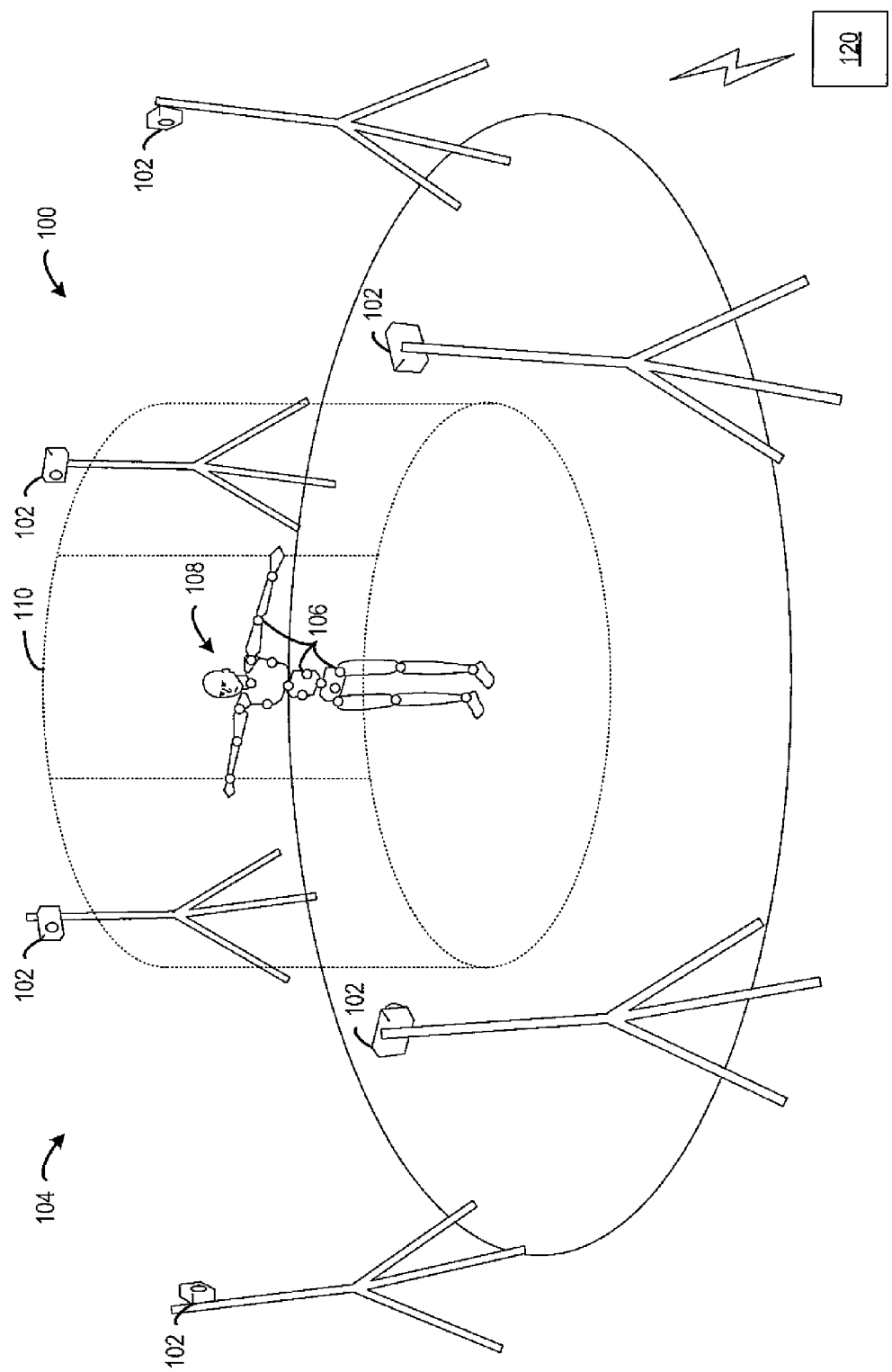
FIG. 1 schematically shows an embodiment of a motion capture system according to the present disclosure.

FIG. 1 shows an embodiment of a motion capture system 100 according to the present disclosure. The motion capture system 100 comprises a plurality of motion capture cameras 102 that are positioned with respect to a scene 104. Each of the plurality of motion capture cameras 102 is operatively coupled to and remotely controllable by a host computing device 120 to record movement of markers 106 within a motion capture volume 110 of the scene 104. Each of the plurality of motion capture cameras are controlled by the host computing device 120. In other words, the host computing device 120 sends control commands to the plurality of motion capture cameras 102 to control operation of the plurality of motion capture cameras 102.

The motion capture system 100 may be setup so that each of the plurality of cameras 102 has a different location and orientation in a motion capture space to capture a different vantage point of the scene 104. More particularly, the plurality of cameras 102 may be configured to collectively detect the capture volume 110 of the scene 104. The capture volume 110 is defined as a three dimensional (3D) space collectively viewed by the plurality of cameras 102 in which the scene 104 and/or markers 106 are detectable.

It will be appreciated that setup of the plurality of motion cameras, definition the capture volume, and camera calibration may be performed in virtually any suitable manner. For example, various different types of reference markers may be used to create data points for interpolation of intrinsic and extrinsic properties of each camera. As another example, various different patterns may be used to create data points, such as a grid or checkerboard pattern.

The markers 106 may be associated with a moving body 108 located in the scene 104. The markers 106 may be identified in order to track motion of the moving body 108. In the illustrated embodiment, the moving body 108 takes the form of a person and the markers 106 correspond to different joints or points of motion of the person. The position of the markers 106 may be detected by the plurality of cameras 102 and resulting marker position data is sent from the plurality of motion capture cameras 102 to the host computing device 120. The position of the markers 106 correspond to movement of the person which may be mapped by the host computing device 120 to a 3D model for computer animation.

Note the moving body may include any suitable object or collection of objects whose position and/or movement is tracked using markers that are fixed relative to the moving body. For example, the moving body may include a face, a person, a group of people, etc. Moreover, any suitable number of markers may be employed on a moving body to suitably track movement of the moving body. In some cases, the moving body may include an object that does not move, but which is still tracked as a point of reference in the scene.

Figure 2:
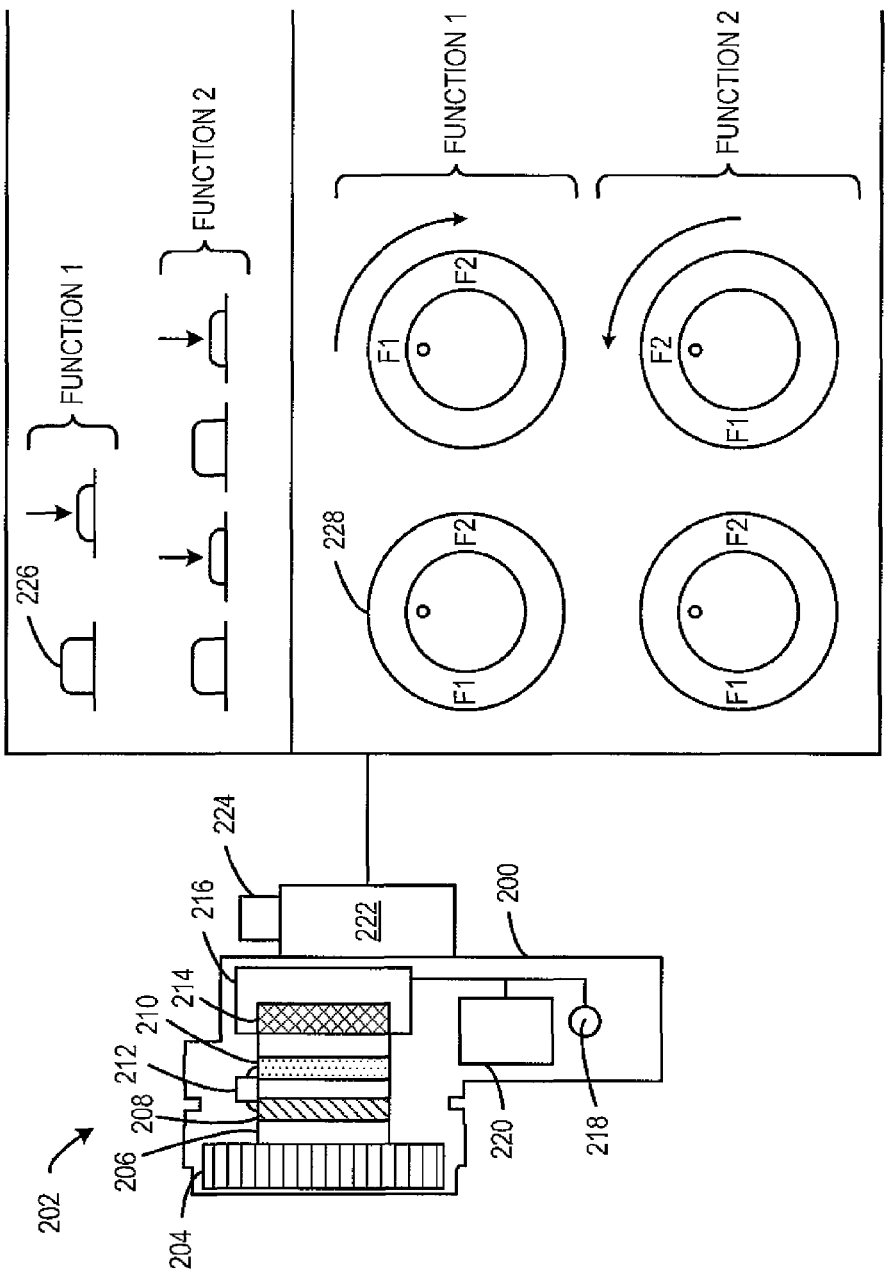
FIG. 2 schematically shows an embodiment of a host-controlled motion capture camera and user interface.

FIG. 2 shows an example embodiment of a motion capture camera 200 that may be used in a motion capture system such as the motion capture system 100 of FIG. 1. The motion capture camera 200 may include a light source 204 that is configured to outwardly direct light in a direction that is substantially coaxially aligned with an axis extending perpendicularly outward from an image sensor 216. Since the light source is substantially coaxially aligned with the motion capture camera 200, incident light from the light source 204 is reflected by passive markers (e.g., markers 106 shown in FIG. 1) back to the image sensor 216 so that light received at the image sensor 216 from the passive markers appears enhanced relative to light received from other positions/directions.

In the illustrated embodiment, the light source 204 takes the form of a light emitting diode (LED) ring that surrounds a lens 206 of the motion capture camera 200. The LED ring 204 may be selectively illuminated to adjust a signal-to-noise ratio of an image detected by the motion capture camera 200. Specifically, the LED ring 204 may be illuminated to increase the noise floor of the signal-to-noise ratio to increase the brightness of passive markers relative to other objects in the scene in order to more easily identify the markers.

In some embodiments, the light source 204 may provide infrared (IR) light that is not visible so as not to distract performers in the capture volume. However, it will be appreciated that any suitable wavelength of light may be used to illuminate a motion capture space. In embodiments where active markers are employed, the light source 204 may be omitted from the motion capture camera 200 or may remain turned off so as not to interfere with capture of the active markers.

In some embodiments, the motion capture camera 200 includes a filter switcher assembly 202 that is operable to switch the motion capture camera 200 between a marker-tracking mode and a scene mode. In the marker-tracking mode, the motion capture camera 200 enhances light from a scene to a greater extent than in the scene mode in order to more easily detect the position of markers over other objects in the scene. For example, in the marker-tracking mode, the motion capture camera 200 may be configured to detect a scene at a signal-to-noise ratio that is different than the signal-to-noise ratio used during the scene mode. For example, the signal-to-noise ratio may be increased so that light reflected from markers is enhanced greater than other objects in the scene. On the other hand, in the scene mode, the signal-to-noise ratio may be set to a level that approximates normal video recording where elements of the scene are substantially not skewed through light enhancement or other methods. In other words, the brightness of markers 106 may be enhanced to a lesser extent or not at all relative to other elements of the scene.

The filter switcher assembly 202 includes the lens 206, a marker-tracking optical filter 208, a scene-view optical component 210, a switching mechanism 212, an imager 214, and an image sensor 216. The lens 206 may be configured to modify light entering the motion capture camera 200. For example, the lens 206 may focus light towards the imager 214 and/or image sensor 216. Depending on the mode of operation of the motion capture camera 200, light modified by lens 206 may pass through the marker-tracking optical filter 208 or the scene-view optical component 210.

The marker-tracking optical filter 208 may be positioned between the lens 206 and the image sensor 216 during the marker-tracking mode to enhance light from markers on a moving body in the motion capture space. In the illustrated embodiment, the marker-tracking optical filter 208 is an IR-pass filter configured to pass IR light to the imager 214 and block visible and ultraviolet light. The IR-pass filter may be used in conjunction with the IR-LED ring to enhance the appearance of passive IR markers during the marker-tracking mode. The marker-tracking optical filter 208 may include any suitable filter that selectively enhances light at a selected wavelength and/or range of wavelengths. Example marker-tracking optical filters may include high-pass, low-pass, and band-pass filters that are configured to transmit (or omit) selected wavelengths of light.

The scene-view optical component 210 may be positioned between the lens 206 and the image sensor 216 during the scene mode to enhance light from the markers on the moving body in the motion capture space to a lesser extent than in the marker-tracking mode. In other words, the scene view optical component may be configured to pass light from markers, the moving body, and non-marker objects in the scene to the image sensor so that substantially everything in the motion capture space may be captured in the scene view. In some embodiments, the scene view optical component may enhance light (e.g., pass/omit) at a different wavelength or range of wavelengths than the marker-tracking optical component. In some embodiments, the scene-view optical component may inversely correspond to the marker-tracking optical filter. For example, if the marker-tracking optical filter is an IR-pass filter then the scene-view optical component may be an IR-cut filter. In some embodiments, the scene-view optical component may be clear (e.g., glass) so as not to filter or substantially enhance light received from the lens.

The switching mechanism 212 is actuatable to positionally interchange the marker-tracking optical filter 208 and the scene-view optical component 210 relative to the image sensor 216. As such, the marker-tracking optical filter 208 and the scene-view optical component 210 may be alternately switched to a position in which light modified by lens 206 passes through the filter or the component to the image sensor 216 based on the mode of operation of the motion capture camera. Specifically, during the marker-tracking mode, the marker-tracking optical filter 208 is positioned between the lens 206 and the image sensor 216 and the scene-view optical component 210 is positioned so as not to modify light received at the image sensor. Likewise, during the scene mode, the scene-view optical component 210 is positioned between the lens 206 and the image sensor 216 and the marker-tracking optical filter 208 is positioned so as not to modify light received at the image sensor. The switching mechanism 212 may include any suitable actuating mechanism. For example, the switching mechanism may include a solenoid that is actuated to positionally interchange the marker-tracking optical filter and the scene-view optical component by a controller 220 of the motion capture camera 200.

The imager 214 may be configured to detect light intensity in the form of electromagnetic radiation that may be spatially resolved in an array of pixels of the imager 214. The image sensor 216 may be configured to create image data indicative of an image detected by the imager 214 by converting the electrical charge of each pixel of the imager 214 to a voltage as each pixel is read from the image sensor 216. In some embodiments, the imager may be included in the image sensor. When the motion capture camera 200 is placed in a motion capture setting, the image sensor 216 may be configured to receive incident light from a capture volume and thereby generate an image of the capture volume.

The motion capture camera 200 may include a controller 220 that includes a processor and memory/data storage that holds executable instructions for controlling the motion capture camera 200. The controller 220 may include any suitable micro-processor or the like. The controller 220 is configured to switch between different operating modes and adjust various operating parameters. For example, the controller 220 may be configured to switch to the marker-tracking mode by controlling the switching mechanism 212 to position the marker-tracking optical filter 208 to relatively enhance light from the markers received at the image sensor 216. Correspondingly, during the marker tracking-mode, the controller 220 may adjust various operating parameters of the motion capture camera to enhance light received from the markers. For example, the controller may reduce the exposure time and/or increase the frame rate to enhance the brightness of markers relative to other objects in the scene. Further, the controller 220 may perform marker-tracking analysis operations, such as brightness thresholding or marker interpolation to identify a position of the markers in the scene.

Furthermore, during the scene mode, the controller 220 controls the switching mechanism 212 to position the scene-view optical component to enhance light from the markers received at the image sensor 216 to a lesser extent than in the marker-tracking mode. Correspondingly, during the scene mode, the controller 220 may adjust various operating parameters of the motion capture camera to enhance light from the markers to a lesser extent than in the marker-tracking mode. For example, the controller may increase the exposure time and/or decrease the frame rate to allow more light to reach the imager in order to form an image where the markers as well as other objects in the scene are visible and substantially not skewed. Note any suitable motion capture camera operating parameter may be adjusted when switching between marker-tracking mode and scene mode.

In some embodiments, the controller 220 may execute preprogrammed macro functions when switching between operating modes that automatically adjust hardware and software functionality of the motion capture camera. For example, executing a marker-tracking mode macro function may command actuation of the switching mechanism as well as adjustment of the exposure time and frame rate. Accordingly, switching between modes can be performed quickly without numerous individual adjustments that would consume time during a motion capture session.

The communication link 218 may enable the motion capture camera 200 to be operatively coupled with a host computing system. The communication link 218 may be a wired or wireless link. In some embodiments, the communication link may include a communication port that accepts a transmission wire. In some embodiments, the communication link may include a transceiver. The controller 220 may send image data to the computing device for image analysis and/or storage via the communication link 218. In some embodiments, the controller 220 may remotely initiate a control operation of the host computing device by sending the control operation through the communication link 218.

In some embodiments, the motion capture camera 200 may be controlled remotely from a host computing system. For example, the host computing system may send control signals to switch between operating modes and/or adjust operating parameters. Accordingly, the controller 220 may be operable to receive a control operation from a host computing device and adjust operation of the motion capture camera 200 in accordance with the received control operation. For example, the controller 220 may receive a control operation from a host computing device that commands the motion capture camera to record movement within a motion capture volume, and the controller 220 may adjust operating parameters of the motion capture camera 200 to comply with the control operation and may send resulting image data to the host computing device. In some embodiments, the motion capture camera 200 may be host-controlled, in the sense that there are no controls on the camera itself that initiates a control operation to the camera itself. Instead, control operations are received from a host computing device.

As discussed above, in some cases, it may be advantageous to remotely initiate a control operation of a host computing device from the location of a motion capture camera, such as during setup, calibration, or the like. Accordingly, the motion capture camera 200 may include a user interface 222 that is user operable to remotely initiate a control operation of a host computing device via user input to or manipulation of the user interface 222. In particular, the user interface 222 enables a user to provide control input that causes a control signal to be sent to a host computing device that is operatively coupled with the motion capture camera 200. In response to receiving the control signal, the host computing device performs a control operation that corresponds to the control signal.

In some cases, the control operation causes the host computing device to adjust a setting or mode at the host computing device. For example, the control operation may cause the host computing device to display a view of the capture volume from the motion capture camera that initiated the control operation on a display device operatively coupled with the host computing device. As a particular example, the control operation may cause the host computing device to display a view of the capture volume from the motion capture camera that initiated the control operation on a display device operatively coupled with the host computing device. The view may facilitate aiming the motion capture camera by the user during setup.

In some cases, the control operation causes the host computing device to adjust an operating parameter, setting, or mode of the motion capture camera that initiated the control signal. For example, the control operation may cause the host computing device to adjust a frame rate of the motion capture camera that initiated the control operation. As another example, the control operation may cause the host computing device to change an operating mode of the motion capture camera that initiated the control operation.

In some cases, the control operation causes the host computing device to adjust a setting or mode of a motion capture camera other than the motion capture camera that initiated the control signal. For example, the control operation may cause the host computing device to place the motion capture camera that initiated the control operation in a first operating mode and one or more other motion capture cameras in a second operating mode different from the first operating mode. In one particular example, a control operation may cause the host computing device to place the motion capture camera that initiated the control operation in a scene mode and place the other motion capture cameras in a marker tracking mode. As another example, a control operation may cause the host computing device to increase the frame rate of the motion capture camera that initiated the control operation and decrease the frame rate of the other motion capture cameras.

It will be appreciated that the user interface 222 may be used by a user to remotely initiate any suitable control operation that is executable by a host computing device from the location of the motion capture camera 200. Example control operations include selecting a view from a motion capture camera for display on a display device, increasing or maximizing a view from a designated motion capture camera relative to views from other motion capture cameras on a display device, changing an operating mode of a designated motion capture camera (e.g., scene mode, marker-tracking mode, etc.) adjusting an operating parameter of a designated motion capture camera (e.g., a focus, a frame rate, exposure level a signal-to-noise ratio, etc.). In some cases, a control operation may have macro functionality that causes a plurality of operations to be sequentially or simultaneously performed. For example, a single control operation that is remotely initiated from a motion capture camera may cause a host computing device to display a camera view from that motion capture camera on a display device (e.g., feedback monitor), change the exposure level of that motion capture camera to better view the camera view on the feedback monitor, and change the operating mode of that motion capture to make the camera view more visible for aiming purposes. By remotely initiating a control operation at the host computing device from the motion capture camera location, multiple trips to the host computer to adjust camera settings may be eliminated. Accordingly, the motion capture camera aiming and setup process may be sped up.

The user interface 222 may take any suitable form that enables a user to provide input to remotely initiate a control operation at a host computing device. In one embodiment, the user interface 222 includes a depressible button 226. The depressible button 226 is depressible to initiate a function or a control operation at the host computing device. In other words, in response to actuation of the depressible button 226 by a user, the motion capture camera 200 sends a control signal to the host computing device to initiate a control operation. In some embodiments, the depressible button 226 is a multi-state actuator that can be placed in different states to initiate different functions or control operations. For example, as illustrated in FIG. 2, a single tap of the depressible button 226 may initiate a first function and a double tap of the depressible button 226 in quick succession may initiate a second function that is different from the first function. In one particular example, the single tap initiates a control operation that switches the motion capture camera 200 between the marker-tracking mode and the scene mode, and the double tap initiates a control operation that adjusts a focus of the motion capture camera 200. As yet another example, the depressible button 226 may be placed in a third state by holding the depressible button down for a designated duration to initiate a third function, such as a reset function that reloads control operations received from the host computing device.

In another embodiment, the user interface 222 includes a selector wheel 228. The selector wheel 228 is rotatable to initiate a function or a control operation at the host computing device. In other words, in response to rotation of the selector wheel 228 to a designated position by a user, the motion capture camera 200 sends a control signal to the host computing device to initiate a control operation. In some embodiments, the selector wheel 228 is a multi-state selector that can be rotated to different positions to initiate different functions or control operations. For example, as illustrated in FIG. 2, the selector wheel may be rotated clockwise to a first position to initiate a first function and may be rotated counterclockwise to a second position to initiate a second function that is different from the first function. In one particular example, the selector wheel 228 is rotatable to a first position to set an exposure level for capture of a scene and rotatable to a second position to set a masking region for the scene. It will be appreciated that the selector wheel may be rotated to any suitable number of positions to initiate any suitable number of different control operations.

In some embodiments, the motion capture camera 200 includes an indicator 224 that is configured to provide user-perceivable feedback in response to a state change of the motion capture camera 200. In some embodiments, the indicator 224 may be activated by a control operation from the host computing device. In some embodiments, the indicator 224 may be activated in response to locally detecting a state change of the motion capture camera 200. A state change may include a change in operating mode, an adjustment of an operating parameter, a selection of a view from the motion capture camera for display on a display device, etc. In some embodiments, the indicator 224 may provide visual feedback that is perceivable by a user. For example, the indicator 224 may include a light emitting diode that lights up to indicate the motion capture camera 200 is selected or that a task is accomplished. In some embodiments, the indicator 224 may provide audio feedback that is perceivable by a user. For example, the indicator 224 may include a speaker that emits a "beep" or other noise to indicate a change in operating mode or an operating parameter adjustment.

It will be appreciated that the above described motion capture camera configuration is an exemplary embodiment and other embodiments of cameras, user interfaces, filters, and/or optical components may be implemented in the motion capture system without departing from the scope of the present disclosure. For example, a filter, optical component, and/or filter switcher assembly may be attached externally to a camera instead of being integrated into the camera. In some embodiments, at least some filtering may be performed via image processing software executable by the controller or the host computing system in addition to or instead of mechanical filters and other software on-board the motion capture camera. As another example, the user interface may be remotely coupled to the motion capture camera, such as a remote control device.

Furthermore, while the illustrated embodiment of the motion capture camera is employed in a passive marker setting, it will be appreciated that the motion capture camera and related methods and applications may be employed in an active marker setting. Thus, in some embodiments, the light source may be omitted from the motion capture camera, and light may instead be produced by the active markers. In some cases, the light source of the motion capture camera may remain turned off during motion capture in an active marker setting to not interfere with light produced by the active markers.

Figure 3:
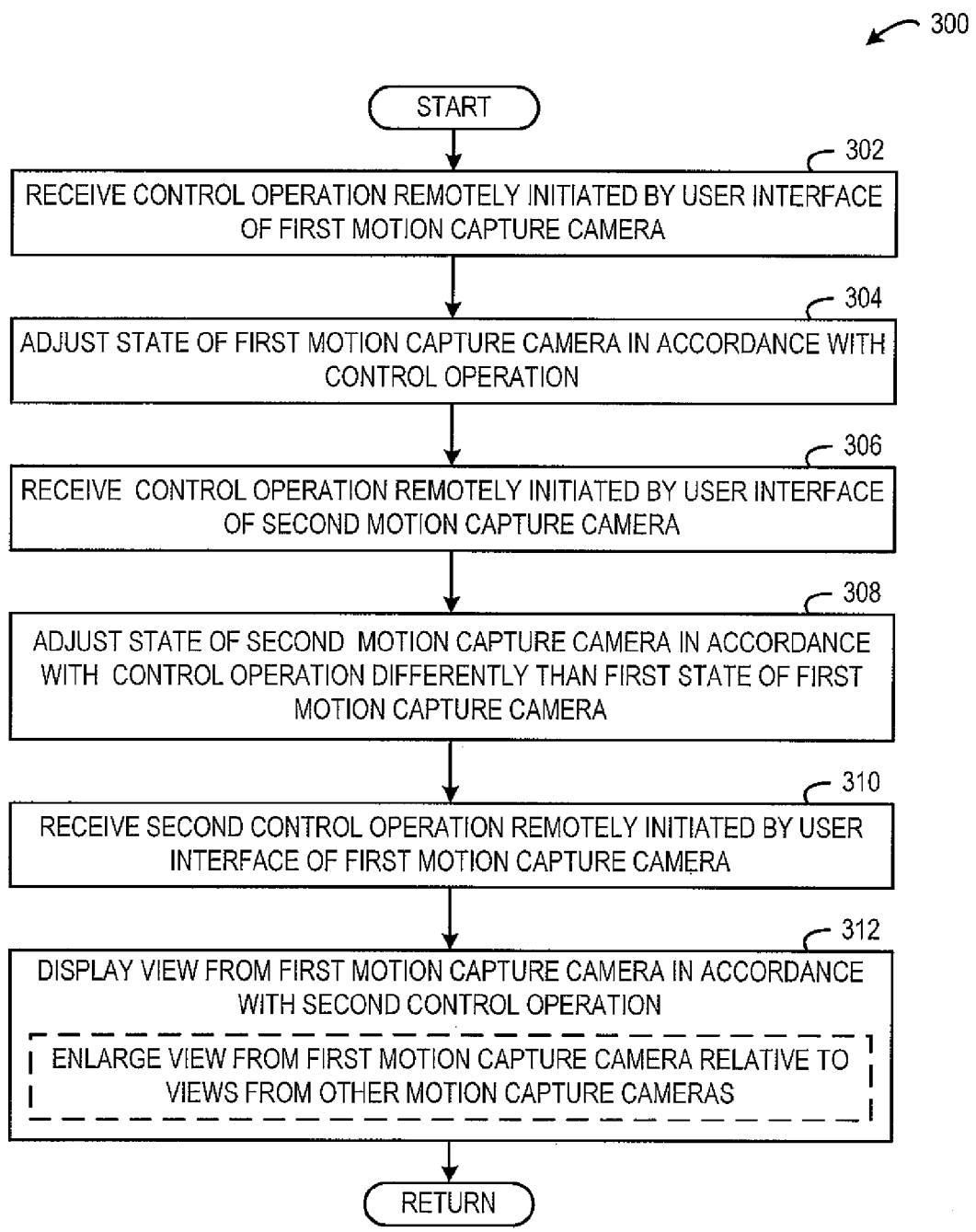
FIG. 3 shows an embodiment of a method for controlling a host computing device.

FIG. 3 shows a flow diagram of an embodiment of a method 300 for controlling a host computing device operatively coupled to a plurality of motion capture cameras. In one example, the method 300 may be performed in a motion-capture system where all cameras are host-controlled by the host computing device. The method 300 is executable, for example, by the host computing device 120 shown in FIG. 1. At 302, the method 300 includes receiving a first control operation remotely initiated by user input to a user interface of a first motion capture camera. The first motion capture camera is one of a plurality of motion capture cameras that are operatively coupled with the host computing device. The control operation is remotely initiated by the user interface in response to receiving user input to the user interface. For example, the user may actuate a depressible button of the user interface to remotely initiate the control operation at the first motion capture camera.

At 304, the method 300 includes adjusting a state of the first motion capture camera in accordance with the control operation. The control operation may cause the state of the first motion capture camera to change in any suitable manner. For example, adjusting the state may include adjusting a focus of the first motion capture camera. As another example, adjusting the state may include adjusting a frame rate of the first motion capture camera. As yet another example, adjusting the state may include changing an operating mode of the first motion capture camera. More particularly, changing the operating mode may include physically interchanging an optical component positioned in a light path upstream of an image sensor of the motion capture camera that initiated the control operation (e.g., changing from scene mode to marker-tracking mode).

In some embodiments, the method may include adjusting another motion capture camera in addition to the first motion capture camera in accordance with the control operation. For example, the control operation that prompts the host computing device to change the operating mode of the first motion capture camera may also prompt the host computing device to change an operating mode of the other motion capture cameras differently than the operating mode of the first motion capture camera. In other words, a single control operation may cause multiple motion capture cameras to change operating modes or adjust other settings differently or the same.

At 306, the method 300 includes receiving a second control operation remotely initiated by user input to a user interface of a second motion capture camera of the plurality of motion capture cameras. For example, the second control operation may be received from the second motion camera when the user has finished aiming the first motion capture camera and has started to aim the second motion capture camera.

At 308, the method 300 includes adjusting a state of the second motion capture camera in accordance with the second control operation differently than the first state of the first motion camera. For example, adjusting the state of the first motion capture camera may include placing the first motion capture camera in a tracking view mode and adjusting the state of the second motion capture camera may include placing the second motion capture camera in a scene mode.

At 310, the method 300 includes receiving a second control operation remotely initiated by a user interface of the first motion capture camera of the plurality of motion capture cameras. The second control operation may be different than the first control operation received from the first motion capture camera. For example, the first control operation may adjust a state of the first motion capture camera, whereas as the second control operation may adjust a state of the host computing device (or a device coupled to the host computing device).

At 312, the method 300 includes displaying a view of the capture volume from the first motion capture camera. The view may be displayed on a display device that is operatively coupled to the host computing device, such as a feedback monitor. In some cases, displaying the view of the capture volume from the first motion capture camera may include enlarging the view relative to views from other motion capture cameras that are displayed on the display device. In one particular example, the view of the first motion capture camera is maximized and the views from the other motion capture cameras are reduced or minimized.

The method 300 may be performed to eliminate multiple trips between motion capture cameras and the host computing device to adjust motion capture camera settings or the like. Instead, control operations can be initiated from different camera locations to control the host computing device remotely. Accordingly, the camera aiming process may be made less tedious, labor intensive, and time consuming.

Figure 4:
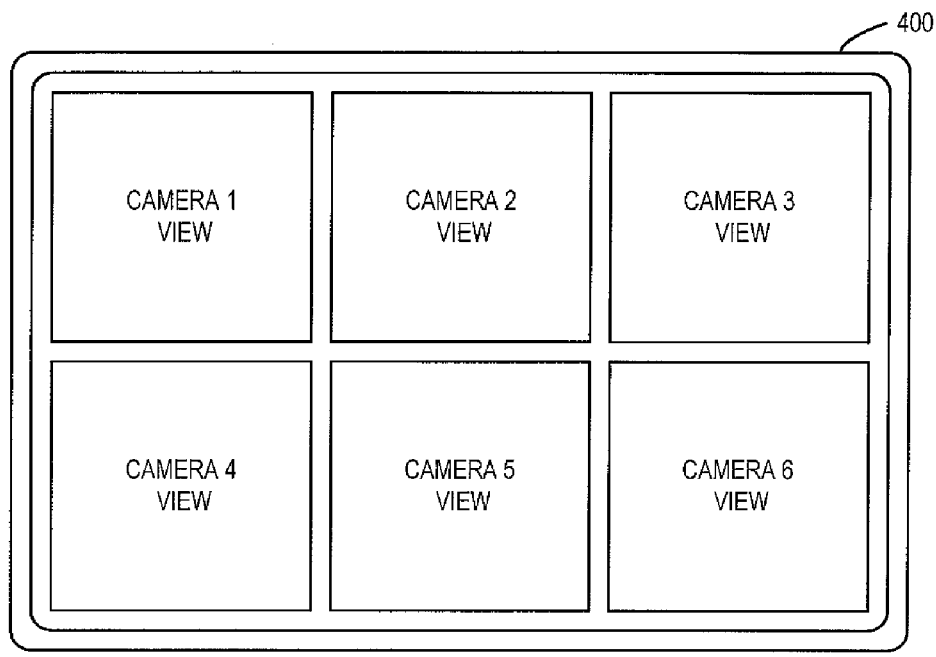
FIG. 4 shows a display device presenting a camera view of each of a plurality of motion capture cameras.
Figure 5:
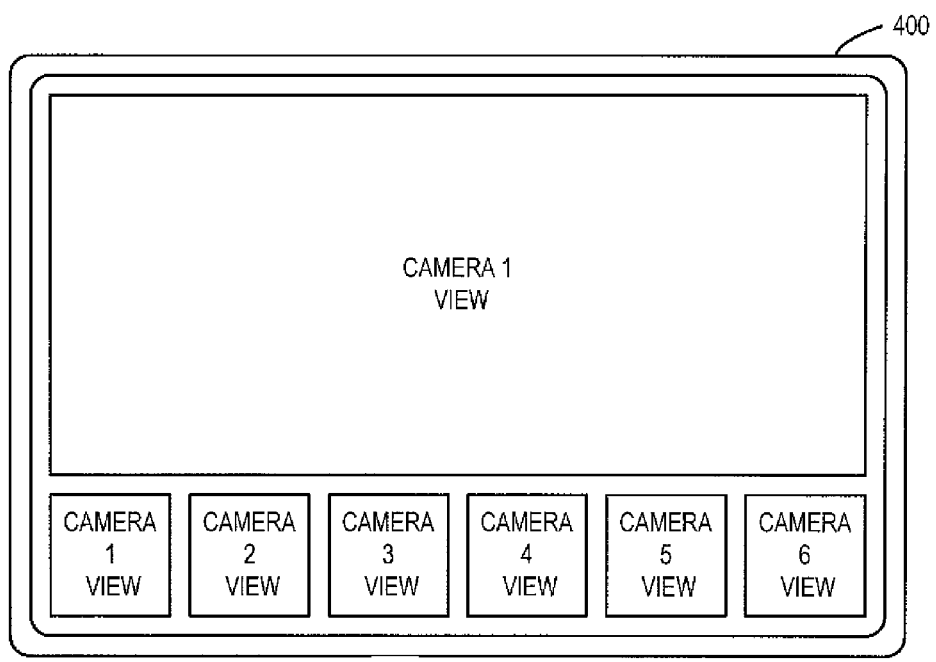
FIG. 5 shows a display device presenting an enlarged camera view of a selected motion capture camera.

FIGS. 4-5 show views from different motion capture cameras that may be displayed on a display device 400 by a host computing device in response to control operations that are remotely initiated from a motion control camera. FIG. 4 shows the display device 400 presenting a camera view of each of a plurality of motion capture cameras of a motion capture system. In the illustrated embodiment, the motion capture system includes six different cameras. Each of the views from the different motion capture cameras may be displayed simultaneously in order for a user to judge the overlap between views to determine a capture volume of a scene. In one example, the control operation that generates this display state is a "display all camera views" operation that is initiated by a user via actuation of a depressible button on one of the plurality of motion capture cameras. In response to actuation of the depressible button, a control signal is sent from the motion capture camera to the host computing device. In response to receiving the control signal, the host computing device adjusts the state of the display device in accordance with a control operation that corresponds to the control signal.

FIG. 5 shows the display device 400 presenting an enlarged camera view of a selected motion capture camera. The selected camera view is enlarged relative to the views of other motion capture cameras in the motion capture system. The selected camera view may be enlarged relative to the other views in order for a user to more easily see that view from the selected camera for aiming purposes. In one example, the control operation that generates this display state is a "display selected camera view" operation that is initiated by a user via actuation of a depressible button on one of the plurality of motion capture cameras. In response to actuation of the depressible button, a control signal is sent from the motion capture camera to the host computing device. In response to receiving the control signal, the host computing device adjusts the state of the display device in accordance with a control operation that corresponds to the control signal. In some implementations, the control operation may cause a selected camera view to be maximized on the display device 400. In some implementations, the control operation may cause other views to be minimized.

Figure 7:
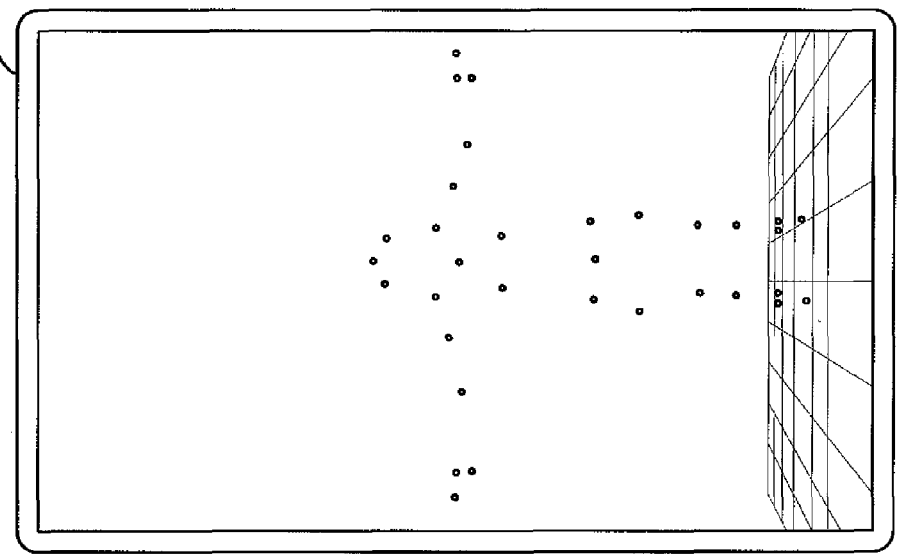
FIG. 7 shows a display device presenting a tracking view mode of a motion.
Figure 6:
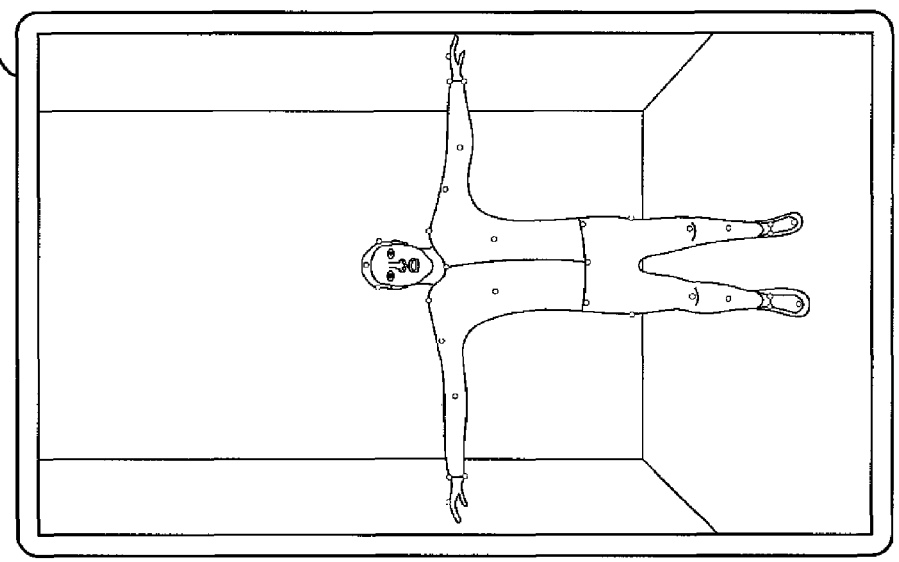
FIG. 6 shows a display device presenting a scene mode of a motion capture camera.

FIGS. 6-7 show the display device 400 presenting views from a motion capture camera generated from different operating modes. FIG. 6 shows the display device 400 presenting a scene view produced by a motion capture camera operating in scene mode. In the illustrated example, the scene view shows an arena motion capture setup. The scene view provides a clear depiction of a person standing in the capture volume. The scene view provides a grayscale image of all of the objects in the scene. In some embodiments, the scene view may be a color image. Further, markers are visible on the person in the scene view. The markers are fixed relative to moving parts of the person. Since light from the markers is enhanced to a lesser extent in the scene mode relative to a marker-tracking mode the person and other objects in the scene are just as visible as the markers. In other words, in the scene mode the markers are not enhanced anymore than other objects in the scene including the person.

FIG. 7 shows the display device 400 presenting a marker-tracking view produced by a motion capture camera operating in marker-tracking mode. In the illustrated example, the marker-tracking view shows the arena motion capture setup. The marker-tracking view shows only the markers without the other objects in the scene including the person. In the illustrated embodiment, the marker-tracking view is substantially black and white. However, in some embodiments, the marker-tracking view may be in grayscale or color. Since light from the markers is enhanced during the marker-tracking mode, the markers appear more visible than the other objects in the scene. In some cases, operating parameters of the motion capture camera may be adjusted so that non-marker objects in the scene may be visible, but may appear darker than the light enhanced markers. Furthermore, the marker-tracking view includes a virtual plane representative of the ground that is defined during a calibration process so that the markers can be shown in relation to a reference.

In one example, during setup of a motion capture system, and more particularly, aiming of a designated motion capture camera, a user provides input to a user interface of the designated motion capture camera to switch the operating mode of the designated motion capture camera from the marker-tracking mode to the scene mode. The user input to the user interface remotely initiates a control operation at a host computing device that is operatively coupled with the designated motion capture camera. In particular, a control signal is sent from the designated motion capture camera to the host computing device. In response to receiving the control signal, the host computing device sends a control operation to the designated motion capture camera to switch operating modes. In this example, the designated motion capture camera is a host-controlled camera that is controlled by the host computing device. As such, the operating mode switch is commanded by the host computing device as opposed to being executed directly by the designated motion capture camera. The user may remotely initiate the operating mode switch in order to more easily perceive the view from the designated motion capture camera on a feedback monitor. In some implementations, the control operation that commands the mode switch also may cause the view of the designated motion capture camera to be automatically displayed on the display device or enlarged relative to views from other motion capture cameras.

Figure 8:
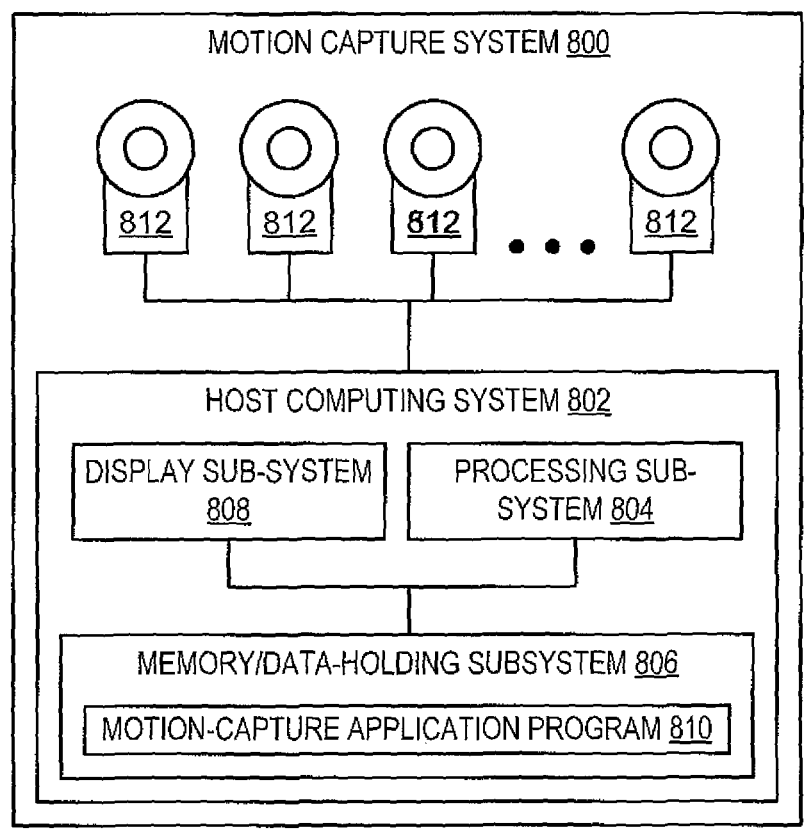
FIG. 8 schematically shows an embodiment of a motion capture system according to the present disclosure.

In some embodiments, the above described methods and processes may be tied to a computing system of a motion capture system. As an example, FIG. 8 schematically shows a motion capture system 800 that includes a host computing system 802 that may perform one or more of the above described methods and processes. The host computing system 802 includes a processing sub-system 804 memory/data-holding sub-system 806, and a display sub-system 808. The host computing system 802 may be operatively coupled to a plurality of motion capture cameras 812.

The processing sub-system 804 may include one or more physical devices configured to execute one or more instructions. For example, the processing sub-system 804 may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The processing sub-system 804 may include one or more processors that are configured to execute software instructions. Additionally or alternatively, the processing sub-system 804 may include one or more hardware or firmware logic machines configured to execute hardware or firmware instructions. The processing sub-system may optionally include individual components that are distributed throughout two or more devices, which may be remotely located in some embodiments.

Memory/data-holding sub-system 806 may include one or more physical devices configured to hold data and/or instructions in the form of motion capture application program 810 executable by the processing sub-system to implement the herein described methods and processes. When such methods and processes are implemented, the state of memory/data-holding sub-system 806 may be transformed (e.g., to hold different data). Memory/data-holding sub-system 806 may include removable media and/or built-in devices. Memory/data-holding sub-system 806 may include optical memory devices, semiconductor memory devices, and/or magnetic memory devices, among others. Memory/data-holding sub-system 806 may include devices with one or more of the following characteristics: volatile, nonvolatile, dynamic, static, read/write, read-only, random access, sequential access, location addressable, file addressable, and content addressable. In some embodiments, processing sub-system 804 and memory/data-holding sub-system 806 may be integrated into one or more common devices, such as an application specific integrated circuit or a system on a chip.

Motion capture application program 810 may be configured to receive image data as well as remotely initiated control signals from the plurality of motion capture cameras 812. The motion capture application program 810 may be configured to send control signals to individually and/or collectively control operation of the plurality of motion capture cameras 812 based on the image data and the remotely initiated control signals. The motion capture application program may be configured to create a marker-tracking view and a scene view from the image data received from the plurality of motion capture cameras 812.

Display sub-system 808 may be used to present a visual representation of data held by memory/data-holding sub-system 806. As the herein described methods and processes change the data held by the memory/data-holding subsystem, and thus transform the state of the memory/data-holding subsystem, the state of display sub-system 808 may likewise be transformed to visually represent changes in the underlying data. Display sub-system 808 may include one or more display devices utilizing virtually any type of technology. Such display devices may be combined with processing sub-system 804 and/or memory/data-holding sub-system 806 in a shared enclosure, or such display devices may be peripheral display devices.

It will be appreciated that the embodiments and method implementations disclosed herein are exemplary in nature, and that these specific examples are not to be considered in a limiting sense, because numerous variations are possible. The subject matter of the present disclosure includes all novel and nonobvious combinations and subcombinations of the various intake configurations and method implementations, and other features, functions, and/or properties disclosed herein.

The invention claimed is:

1. A motion capture system comprising:
   a plurality of motion capture cameras positioned in various locations and orientations with respect to a motion capture volume;
   a host computing device, operatively coupled with the plurality of motion capture cameras, to remotely control operation of the plurality of motion capture cameras to record movement within the motion capture volume;
   a display device operatively coupled to the host computing device and separate from the plurality of motion capture cameras, the display device being configured to display one or more views of the motion capture volume captured by one or more motion capture cameras of the plurality of motion capture cameras; and
   at least one of the plurality of motion capture cameras including a user-interface operable by a user to remotely initiate a control operation of the host computing device or the plurality of motion capture cameras, where one such control operation includes a first motion capture camera of the plurality of motion capture cameras issuing a command which causes the host computing device to change one or both of a position and size of the first motion capture camera's view of the motion capture volume displayed on the display device.

2. The system of claim 1, where the display device is configured to display each view of the motion capture volume for each motion capture camera, and where changing one or both of a position and size of the first motion capture camera's view of the motion capture volume comprises changing one or both of the position and size of the first motion capture camera's view of the motion capture volume relative to each other motion capture camera's view of the motion capture volume.

3. The system of claim 1, where the control operation prompts the host computing device to control the first motion capture camera to provide a user-perceivable indication that a view from the motion capture camera is selected for display.

4. The system of claim 1, where the display device presents a view of the motion capture volume from each of the plurality of motion capture cameras, and the control operation includes enlarging the view of the motion capture volume from the first motion capture camera relative to views from other motion capture cameras.

5. The system of claim 1, where the control operation prompts the host computing device to adjust a state of the first motion capture camera.

6. The system of claim 5, where adjusting the state includes adjusting a focus of the first motion capture camera.

7. The system of claim 5, where adjusting the state includes adjusting a frame rate of the first motion capture camera.

8. The system of claim 5, where adjusting the state includes changing an operating mode of the first motion capture camera.

9. The system of claim 8, where changing the operating mode includes physically interchanging an optical component positioned in a light path upstream of an image sensor of the first motion capture camera.

10. The system of claim 8, where the control operation that prompts the host computing device to change the operating mode of the first motion capture camera also prompts the host computing device to change an operating mode of other motion capture cameras differently than the operating mode of the first motion capture camera that initiated the control operation.

11. A motion capture camera apparatus comprising:
    an image sensor configured to receive incident light from a capture volume and thereby generate an image of the capture volume;
    a controller, operable to receive a control operation from a host computing device to record movement within the capture volume via a plurality of motion capture cameras including the motion capture camera apparatus, wherein the host computing device is configured to remotely control operation of the plurality of motion capture cameras and a display device being configured to display one or more views of the capture volume captured by one or more of the plurality of motion capture cameras, and wherein the display device is separate from the plurality of motion capture cameras; and
    a user interface operable by a user to remotely initiate a control operation of the host computing device, where the control operation includes causing the host computing device to change one or both of a size and position of a view of the capture volume captured by the motion capture camera apparatus displayed on the display device relative to other views of the capture volume captured by other motion capture cameras of the plurality of motion capture cameras also displayable on the display device.

12. The apparatus of claim 11, where the control operation prompts the host computing device to adjust a state of the motion capture camera apparatus.

13. The apparatus of claim 12, where adjusting the state includes at least one of adjusting a focus of the motion capture camera apparatus, adjusting a frame rate of the motion capture camera apparatus, and changing an operating mode of the motion capture camera apparatus.

14. The apparatus of claim 11, where the user interface includes a multi-state actuator, the multi-state actuator adjustable to a first state to remotely initiate a first control operation of the host computing device and adjustable to a second state to remotely initiate a second control operation of the host computing device different from the first control operation.

15. The apparatus of claim 14, where the multi-state actuator includes a depressible button, where the first state includes a single tap of the depressible button, and where the second state includes a double tap of the depressible button.

16. The apparatus of claim 14, where the multi-state actuator includes a selector wheel, where the first state includes rotating the selector wheel to a first position, and where the second state includes rotating the selector wheel to a second position different from the first position.

17. A method for controlling a host computing device operatively coupled to a plurality of motion capture cameras, comprising:
at the host computing device, receiving a first control operation through a communication link, where the first control operation is remotely initiated by user input to a user interface of a first motion capture camera of the plurality of motion capture cameras, where the host computing device is operatively coupled to a display device configured to present a view of a motion capture volume from each of the plurality of motion capture cameras, where the display device is separate from the plurality of motion capture cameras, and where the first control operation includes changing one or both of a size and position of the view of the motion capture volume from the first motion capture camera displayed on the display device relative to the views from other motion capture cameras displayable on the display device.

18. The method of claim 17, further comprising:
receiving a second control operation remotely initiated by user input to a user interface of a second motion capture camera of the plurality of motion capture cameras; and
adjusting a state of the second motion capture camera in accordance with the second control operation differently than a state of the first motion capture camera.

19. The method of claim 18, where adjusting the state of the first motion capture camera includes placing the first motion capture camera in a tracking view mode and adjusting the state of the second motion capture camera includes placing the second motion capture camera in a scene mode.

20. The method of claim 17, where the display device is configured to simultaneously present the view of the motion capture volume from each of the plurality of motion capture cameras.

* * * * *